(12) United States Patent
Chew

(10) Patent No.: US 8,223,961 B2
(45) Date of Patent: Jul. 17, 2012

(54) METHOD AND DEVICE FOR ANSWERING AN INCOMING CALL

(75) Inventor: Kee (Basil) Joo Chew, Singapore (SG)

(73) Assignee: Motorola Mobility, Inc., Libertyville, IL (US)

( * ) Notice: Subject to any disclaimer, the term of this patent is extended or adjusted under 35 U.S.C. 154(b) by 1199 days.

(21) Appl. No.: 11/611,039

(22) Filed: Dec. 14, 2006

(65) Prior Publication Data

US 2008/0144805 A1 Jun. 19, 2008

(51) Int. Cl.
*H04M 1/00* (2006.01)

(52) U.S. Cl. ............ 379/420.02; 455/569.2; 379/373.01

(58) Field of Classification Search ............. 379/420.01, 379/420.02, 420.04, 388.02, 433.02, 388.01, 379/373.01; 455/350, 569.1, 569.2
See application file for complete search history.

(56) References Cited

U.S. PATENT DOCUMENTS

| | | | |
|---|---|---|---|
| 4,737,976 | A | 4/1988 | Borth et al. |
| 5,588,041 | A | 12/1996 | Meyer, Jr. et al. |
| 5,712,911 | A * | 1/1998 | Her ........................... 379/388.01 |
| 5,749,072 | A | 5/1998 | Mazurkiewicz et al. |
| 5,802,167 | A | 9/1998 | Hong |
| 6,108,532 | A | 8/2000 | Matsuda et al. |
| 6,150,961 | A | 11/2000 | Alewine et al. |
| 6,223,034 | B1 | 4/2001 | Yamashita |
| 6,496,709 | B2 | 12/2002 | Murray |
| 7,324,812 | B2 * | 1/2008 | Wegman ....................... 455/416 |
| 2001/0034250 | A1 | 10/2001 | Chadha |
| 2003/0100261 | A1 * | 5/2003 | Gusler et al. ..................... 455/18 |
| 2003/0119487 | A1 * | 6/2003 | Silvester ....................... 455/412 |
| 2003/0190022 | A1 | 10/2003 | Lee et al. |
| 2004/0127233 | A1 | 7/2004 | Harris et al. |
| 2004/0198332 | A1 * | 10/2004 | Lundsgaard .................. 455/417 |
| 2005/0078810 | A1 * | 4/2005 | Cromwell et al. ............ 379/188 |
| 2005/0100140 | A1 * | 5/2005 | Tsai ................................ 379/82 |
| 2005/0180556 | A1 * | 8/2005 | Satoh ....................... 379/373.01 |
| 2005/0255811 | A1 | 11/2005 | Allen et al. |
| 2006/0116175 | A1 * | 6/2006 | Chu ............................. 455/567 |
| 2007/0049255 | A1 * | 3/2007 | Bhakta et al. ............... 455/412.2 |
| 2007/0218958 | A1 * | 9/2007 | Emery et al. ............... 455/569.1 |
| 2008/0056466 | A1 * | 3/2008 | Nishimura ................. 379/88.22 |

FOREIGN PATENT DOCUMENTS

WO 2005103862 A2 11/2005

OTHER PUBLICATIONS

Patent Cooperaton Treaty, "Notification of Transmittal of the International Search Report and the Written Opinion of the International Searching Authority, or the Declaration", Apr. 16, 2008, pp. 1-8, PCT/US2007/83977.

* cited by examiner

*Primary Examiner* — Olisa Anwah

(57) ABSTRACT

A method (200) and device (100) for answering an incoming call to an electronic communication device enables the device to answer the incoming call using one of a plurality of answer modes, in response to when an answer call signal is input from a user of the device. The method (200) comprises allowing the device (100) to answer the incoming call, using a first answer mode, in response to an answer call signal input from a user at a user interface of the device before expiration of a first predetermined time period (step 205). The device is then allowed to answer the incoming call, using a second answer mode, in response to an answer call signal input from the user at the user interface of the device after expiration of the first predetermined time period (step 210).

20 Claims, 3 Drawing Sheets

METHOD AND DEVICE FOR ANSWERING AN INCOMING CALL

FIELD OF THE INVENTION

The present invention relates generally to electronic communication devices, and in particular to answering incoming calls using multiple answer modes.

BACKGROUND

Many modern mobile telephones can be answered using either an earpiece answer mode, a headset answer mode or a speakerphone answer mode. The headset answer mode requires an external headset accessory, comprising an earpiece and microphone, to be operatively coupled to the telephone by wires or a radio link. The earpiece answer mode is a conventional telephone answering mode where audio data concerning an incoming call, such as a caller's voice, is emitted using a low volume speaker that is an integral part of the telephone. In the earpiece mode of operation the audio data is generally heard only when an earpiece of the telephone is held close to a callee's ear. The speakerphone answer mode generally emits audio data using a higher volume so that the audio data can be heard by a callee from a reasonable distance, such as 1-4 feet from the speaker that is an integral part of the telephone. Similarly, the earpiece answer mode generally uses a less sensitive telephone microphone setting because callees generally speak directly into a telephone microphone when using an earpiece answer mode, and a speakerphone answer mode generally uses a more sensitive telephone microphone setting because a speakerphone answer mode is generally intended to receive sounds from a reasonable distance, such as 1-4 feet from the speaker that is an integral part of the telephone.

The earpiece answer mode is generally activated on a mobile telephone simply by pressing an answer key located on a keypad of the telephone. A speakerphone answer mode is generally activated on a mobile telephone in a more complicated manner, such as using a soft key that is selected from a menu shown on a display screen of a telephone. Also, the headset answer mode requires an external headset accessory to be either physically coupled to the mobile telephone or wireless coupled by using soft keys.

Answering a mobile telephone using an earpiece answer mode while simultaneously performing an activity, where a user's hands and vision are preoccupied can be cumbersome. Various devices and techniques for enabling mobile telephones to be answered in a hands-free and head-up manner have therefore been developed. Such devices and techniques include the use of peripheral devices such as headsets and docking stations that enable a mobile telephone to be answered when a user is not holding the telephone. For example, a mobile telephone docking station attached to a vehicle's dashboard can be wirelessly coupled to a headset, or can cause a mobile telephone to automatically answer an incoming call in a speakerphone answer mode when a mobile telephone is positioned in the docking station.

However, peripheral devices such as headsets are extra equipment that need to be carried along with a mobile telephone, which is not always convenient. Further, peripheral devices such as docking stations can be bulky and are generally not easily portable, and thus are often conveniently useable only in a single location, such as in a single vehicle.

SUMMARY OF THE INVENTION

According to one aspect, the present invention is a method for answering an incoming call to an electronic communication device. The method comprises allowing the device to answer the incoming call, using a first answer mode, in response to an answer call signal input from a user at a user interface of the device before expiration of a first predetermined time period. The device is then allowed to answer the incoming call, using a second answer mode, in response to an answer call signal input from the user at the user interface of the device after expiration of the first predetermined time period.

Embodiments of the present invention thus enable an electronic communication device, such as a mobile telephone, to answer an incoming call using one of a plurality of answer modes, in response to when an answer call signal is input from a user of the device. That can add significant convenience because, for example, drivers of vehicles or other users who seek hands-free operation of an electronic communication device can allow the device to be automatically reconfigured to answer an incoming call using a speakerphone answer mode, instead of an earpiece answer mode, by waiting for expiration of a predetermined time period after the call is received, but without requiring any additional keypad inputs or manipulation of the device.

BRIEF DESCRIPTION OF THE DRAWINGS

In order that the invention may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Figure 1:
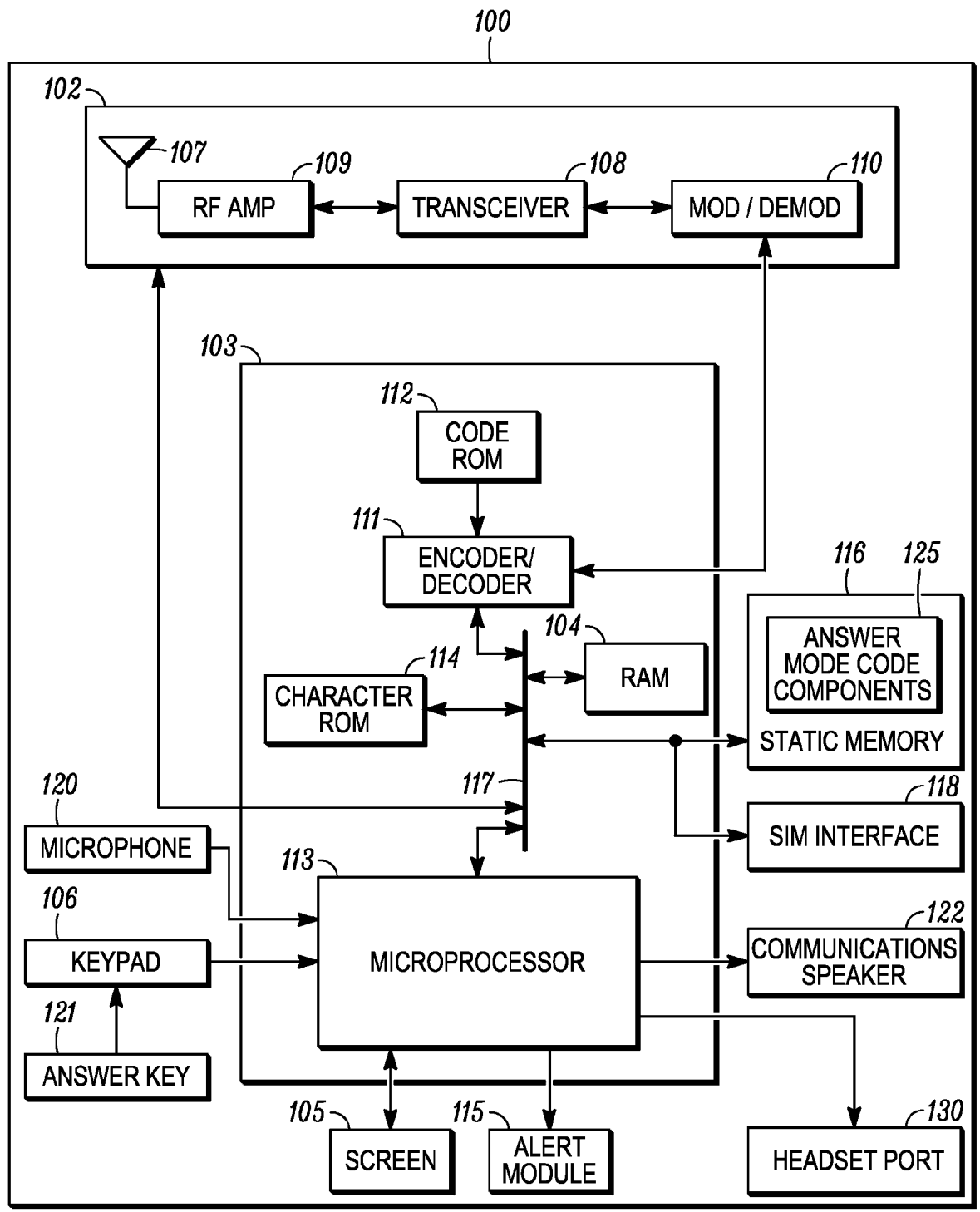
FIG. 1 is a schematic diagram illustrating an electronic communication device in the form of a mobile telephone that performs a method of answering an incoming call, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method and system for answering an incoming call to an electronic communication device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a method, system or apparatus that comprises a list of elements does not include only those elements but may include other elements not expressly listed or inherent to such method, system or apparatus. An element preceded by "comprises a . . ." does not, without more constraints, preclude the existence of additional identical elements in the method, system or apparatus that comprises the element.

Referring to FIG. 1, a schematic diagram illustrates an electronic communication device in the form of a mobile telephone 100 that performs a method of answering an incoming call, according to some embodiments of the present invention. The mobile telephone 100 comprises a radio frequency communications unit 102 coupled to be in communication with a processor 103. The mobile telephone 100 also has a keypad 106 and a display screen 105, such as a touch screen, coupled to be in communication with the processor 103. Typically, a conventional multifunction key that can function as an answer key 121 is located on the keypad 106.

The processor 103 includes an encoder/decoder 111 with an associated code Read Only Memory (ROM) 112 for storing data for encoding and decoding voice or other signals that may be transmitted or received by the mobile telephone 100. The processor 103 also includes a microprocessor 113 coupled, by a common control, data and address bus 117, to the encoder/decoder 111, a character Read Only Memory (ROM) 114, the radio frequency communications unit 102, a Random Access Memory (RAM) 104, programmable memory 116 and a Subscriber Identity Module (SIM) interface 118. The programmable memory 116 and a SIM operatively coupled to the SIM interface 118 each can store, among other things, selected incoming text messages, a Telephone Number Database (TND) comprising a number field for telephone numbers and a name field for identifiers associated with one of the numbers in the name field.

The radio frequency communications unit 102 is a combined receiver and transmitter having a common antenna 107. The communications unit 102 has a transceiver 108 coupled to the antenna 107 via a radio frequency amplifier 109. The transceiver 108 is also coupled to a combined modulator/demodulator 110 that couples the communications unit 102 to the processor 103.

The microprocessor 113 has ports for coupling to the keypad 106, to the screen 105, and to an alert module 115 that typically contains an alert speaker (that is a high power output speaker that can be a polyphonic speaker), vibrator motor and associated drivers. Also, the microprocessor 113 has ports for coupling to a headset port 130, a microphone 120 and to a communications speaker 122. The character ROM 114 stores code for decoding or encoding data such as text messages that may be received by the communications unit 102. In some embodiments of the present invention, the character ROM 114, the programmable memory 116, or a SIM also can store operating code (OC) for the microprocessor 113 and code for performing functions associated with the mobile telephone 100. For example, as described above, the programmable memory 116 can comprise answer mode computer readable program code components 125 that can be used to execute a method of the present invention.

According to some embodiments of the present invention, an electronic communication device, such as the mobile telephone 100, can use different answer modes to answer an incoming call depending on whether a predetermined time period has expired. That can enable a user of the mobile telephone 100 to select between different available answer modes simply by answering an incoming call before expiration of the predetermined time period, or by waiting and answering the incoming call after expiration of the predetermined time period.

For example, the mobile telephone 100 can be programmed, according to the answer mode computer readable program code components 125, to allow the mobile telephone 100 to answer an incoming call using an earpiece answer mode if the answer key 121 on the keypad 106 is depressed before expiration of a predetermined time period, and to answer the incoming call using a speakerphone answer mode if the same answer key 121 on the keypad 106 is depressed after expiration of the predetermined time period.

Such functionality can add significant convenience for users of the mobile telephone 100. For example, if a user of the mobile telephone 100 is driving and does not want to answer an incoming call using an earpiece answer mode, the user can wait for a predetermined time period after the incoming call is received and then press the answer key 121. The mobile telephone 100 then automatically answers the incoming call using a speakerphone answer mode. That means that the user does not need to take extra time to attach a peripheral device, such as a headset, or read information on the display screen 105 so as to reconfigure the mobile telephone 100 to activate the speakerphone answer mode. Rather, the mobile telephone 100 automatically and easily reconfigures itself so that the user can answer the mobile telephone 100 in a hands-free and head-up fashion merely by depressing the single answer key 121. As will be understood by those skilled in the art, the answer key 121 is generally conveniently located on the mobile telephone 100 and very familiar to users of the mobile telephone 100.

A predetermined time period that is used to identify whether an incoming call should be answered in a first answer mode or in a second answer mode can be defined in various ways. For example, according to some embodiments of the present invention, a predetermined time period can be defined as a number of repetitions of a cycle associated with an alerting function of the mobile telephone 100. An alerting function can include, for example, outputting a cyclical ring tone from an alerting speaker or a cyclical vibration from a vibrator motor included in the alert module 115. Thus a predetermined time period can be defined as a number of repetitions of a ring tone or of a vibration cycle associated with an incoming call. Such a predetermined time period, before which the mobile telephone 100 is allowed to answer an incoming call using a first answer mode, and after which the mobile telephone 100 is allowed to answer the incoming call using a second answer mode, also can be defined in units of time such as a given number of seconds after an incoming call is received at the mobile telephone 100.

Further, according to some embodiments of the present invention, such a predetermined time period can be programmed by a user. That enables a user of the mobile telephone 100 to program, for example, a short predetermined time period if the user prefers to be able to switch quickly from a first answer mode to a second answer mode. Alternatively, a longer predetermined time period can be programmed if a user prefers to have additional time to consider whether to answer the mobile telephone 100 in a first answer mode or a second answer mode.

A first answer mode and a second answer mode can be defined in various ways. For example, as described above, according to some embodiments of the present invention a first answer mode can be an earpiece answer mode and a second answer mode can be a speakerphone answer mode. Such first and second answer modes can be changed, however, so that a first answer mode is a speakerphone answer mode and a second answer mode is an earpiece answer mode. Further, other types of answer modes can be used. For example, a first answer mode can be a low volume answer mode, such as would be selected by a user who is answering an incoming call in a quiet room. A second answer mode then can be a high volume answer mode, such as would be selected by a user who is answering an incoming call in a noisy subway train. Such a high volume second answer mode can increase, relative to the low volume first answer mode, the volume level of the communications speaker 122, and also can adjust processing of audio signals received through the microphone 120 so as to minimize background noise and transmit clear voice data to a caller. According to some embodiments of the present invention, a user of the mobile telephone 100 also can program the mobile telephone 100 to respond to incoming calls using particular answer modes. A user can further program features of particular answer modes, such as volume level settings and microphone sensitivity settings. Still other types of answer modes are also useable, such as, for example a video telephony answer mode or a headset answer mode.

According to still other embodiments of the present invention, the alerting function of the mobile telephone 100 can be programmed to change after expiration of a predetermined time period, indicating to a user that the mobile telephone 100 no longer will be allowed to answer an incoming call in a first answer mode, but now will be allowed to answer the incoming call in a second answer mode. For example, after an incoming call is received at the mobile telephone 100, the alert module 115 can play a first ring tone for a predetermined time period. If the answer key 121 is pressed before expiration of the predetermined time period, then the mobile telephone 100 will be answered in a first answer mode. After expiration of the predetermined time period, the alert module 115 can play a second ring tone. As described above, if the answer key 121 is pressed after expiration of the predetermined time period, then the mobile telephone 100 will be answered in a second answer mode. Other indications to a user that the predetermined time period has expired can include, for example, tones or a synthesized voice message played through the communications speaker 122. Further, various alerting functions besides ring tones also can be used to identify a particular answer mode, such as a vibration alerting function or an electrical stimulation alerting function.

A method of the present invention for answering an incoming call to an electronic communication device, such as the mobile telephone 100, also can comprise allowing an electronic communication device to answer an incoming call by selecting from more than just two answer modes. For example, the mobile telephone 100 can be programmed so that the mobile telephone 100 is allowed to answer an incoming call using a first answer mode before expiration of a first predetermined time period, and then is allowed to answer the same incoming call using a second answer mode after expiration of the first predetermined time period but before expiration of a second predetermined time period, and then is allowed to answer the same incoming call using a third answer mode after expiration of the second predetermined time period. Thus, for example, a user of the mobile telephone 100 can program the mobile telephone 100 to answer an incoming call using an earpiece answer mode if the answer key 121 is pressed before the alert module 115 emits two "rings;" using a speakerphone answer mode if the answer key 121 is pressed after the alert module 115 emits two "rings," but before the alert module 115 emits four "rings;" and finally using a video telephony answer mode if the answer key 121 is pressed after the alert module 115 emits four "rings."

Figure 2:
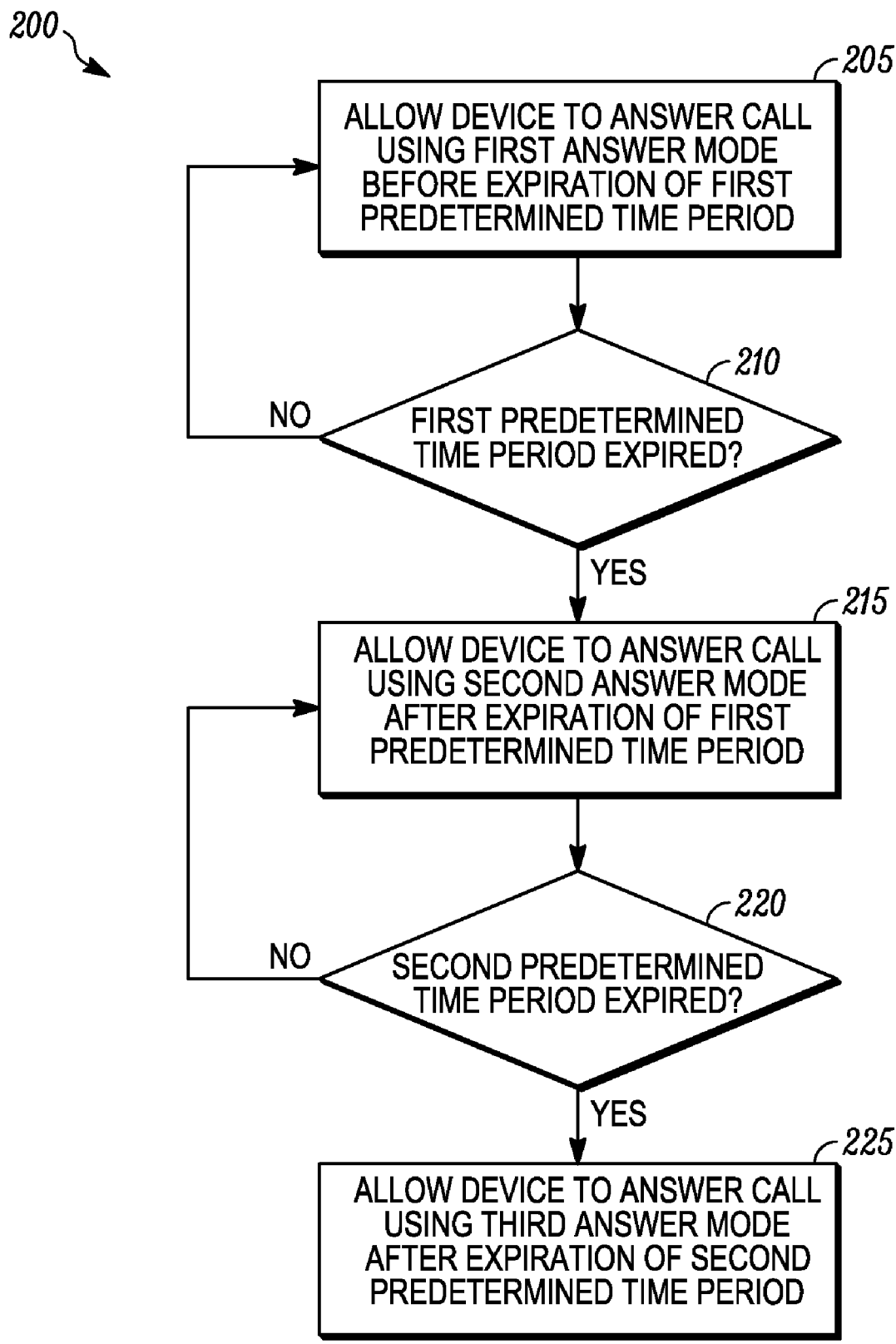
FIG. 2 is a general flow diagram illustrating a method for answering an incoming call to an electronic communication device, according to some embodiments of the present invention.

Referring to FIG. 2, a general flow diagram illustrates a method 200 for answering an incoming call to an electronic communication device such as the mobile telephone 100, according to some embodiments of the present invention. At step 205, the mobile telephone 100 is allowed to answer the incoming call, using a first answer mode, in response to an answer call signal input from a user at a user interface of the device before expiration of a first predetermined time period. For example, the mobile telephone 100 can be configured to allow an incoming call to be answered in a first answer mode, such as an earpiece or headset answer mode, before expiration of a predetermined number of rings. In earpiece answer mode the callee's speech is captured by the microphone 120, that is integral with the mobile telephone 100 and the callers speech is received at the communications speaker 122 that is also integral with the mobile telephone 100. As is known, the callee's speech is transmitted vie the communications unit 102 over a telephone network to the caller. In the headset answer mode a wired or wireless (typically by radio connection) headset, comprising an external speaker and microphone, is operatively coupled to communicate with the mobile telephone 100 through the headset port 130. The incoming call can be answered in response to an answer call signal processed by the microprocessor 113 in response to a user pressing the answer key 121 on the keypad 106 of the mobile telephone 100. At step 210, it is determined whether the first predetermined time period has expired. If not, then the method 200 returns to step 205 where the mobile telephone 100 is allowed to answer the incoming call using the first answer mode.

At step 215, the mobile telephone 100 is allowed to answer the incoming call, using a second answer mode, in response to an answer call signal input from the user at the user interface of the mobile telephone 100 after expiration of the first predetermined time period. For example, the mobile telephone 100 can be configured to allow an incoming call to be answered in a second answer mode, such as a speakerphone answer mode, when the answer key 121 is pressed after expiration of the predetermined number of rings. Typically, in speakerphone answer mode the polyphonic speaker (or a relatively high power output speaker) of the alert module 115 is used in addition to, or as an alternative to the communications speaker 122 to provide communication after the incoming call has been answered. In speakerphone answer mode, the speaker in alert module 115 is driven to provide a much louder output volume than is provided during normal answer mode in which the communications speaker 122 is used. Also, in speakerphone answer mode the sensitivity of the microphone 120 is increased to detect speech from the user whose mouth is typically at least 20 cm from the microphone 120.

At step 220, it is determined whether the second predetermined time period has expired. If not, then the method 200 returns to step 215 where the electronic communication device is allowed to answer the incoming call using the second answer mode.

At step 225, the mobile telephone 100 is allowed to answer the incoming call, using a third answer mode, in response to an answer call signal input from the user at the user interface of the mobile telephone 100 (for instance by actuation of a key on the keypad 106) after expiration of a second predetermined time period. For example, the mobile telephone 100 can be configured to allow an incoming call to be answered in a third answer mode, such as a video telephony answer mode, when the answer key 121 is pressed after expiration of a predetermined number of additional rings.

Figure 3:
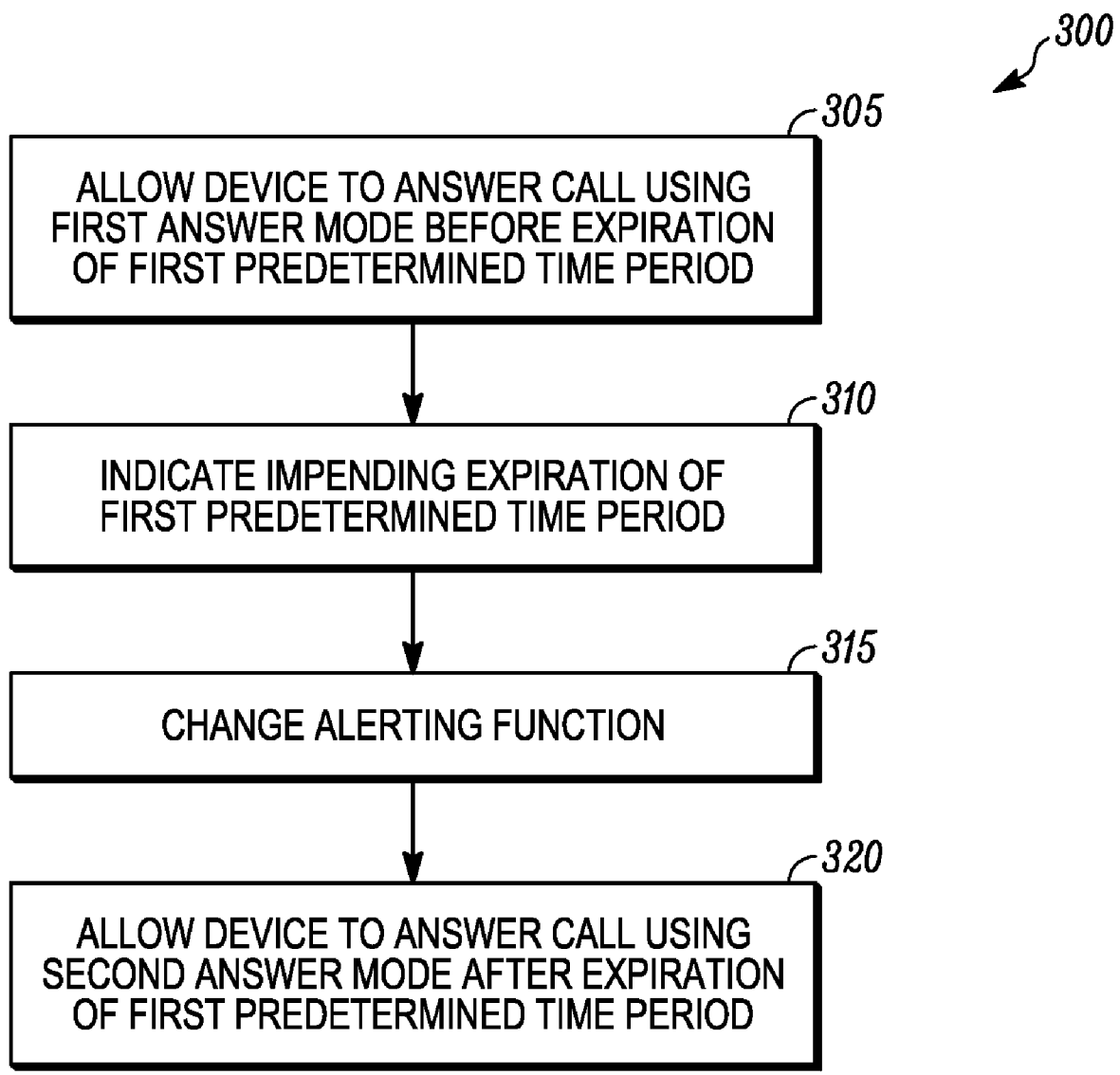
FIG. 3 is a general flow diagram illustrating a further method for answering an incoming call to an electronic communication device, according to some embodiments of the present invention.

Referring to FIG. 3, a general flow diagram illustrates a method 300 for answering an incoming call to an electronic communication device such as the mobile telephone 100, according to some further embodiments of the present invention. At step 305, the mobile telephone 100 is allowed to answer the incoming call, using the first answer mode, in response to an answer call signal input from a user at a user interface of the device before expiration of a first predetermined time period. For example, the mobile telephone 100 can be configured to allow an incoming call to be answered in the first answer mode, such as a speakerphone answer mode, before expiration of a predetermined number of rings.

At step 310, an impending expiration of the first predetermined time period is indicated. For example, a synthesized voice message can be played over the communications speaker 122 of the mobile telephone 100 stating: "Switching to earpiece answer mode in two rings", which indicates to a user of the mobile telephone 100 that the answer key 121 must be pressed within the next two rings if the user desires to answer the incoming call in the first answer mode. Other indications of an impending expiration of the first predetermined time period also can be used such as a simple tone or a change in an alerting function.

At step 315, an alerting function of the mobile telephone 100 changes when the first predetermined time period expires. For example, as described above, a change can occur between various types of alerting functions such as different ring tones, vibration alerting functions, or electrical stimulation alerting functions.

At step 320, the mobile telephone 100 is allowed to answer the incoming call, using a second answer mode, in response to an answer call signal input from the user at the user interface of the device after expiration of the first predetermined time period. For example, the mobile telephone 100 can be configured to allow an incoming call to be answered in a second answer mode, such as an earpiece answer mode, when the answer key 121 is pressed after expiration of the first predetermined time period.

Those skilled in the art will recognize that the present invention further can be embodied in a system of the mobile telephone 100. The programmable memory 116 can comprise a computer readable medium such as a random access memory (e.g., static random access memory (SRAM)), read only memory (e.g., programmable read only memory (PROM), or erasable programmable read only memory (EPROM)), or hybrid memory (e.g., FLASH) as is well known in the art. The medium then comprises the answer mode computer readable program code components 125 that, when processed by the microprocessor 113, are configured to cause execution of the above described steps of the method 200 and the method 300.

Embodiments of the present invention thus enable an electronic communication device, such as the mobile telephone 100, to answer an incoming call using one of a plurality of answer modes, in response to when an answer call signal is input from a user of the device. That can add significant convenience because, for example, drivers of vehicles or other users who seek hands-free operation of an electronic communication device can allow the device to be automatically reconfigured to answer an incoming call using a speakerphone answer mode, instead of an earpiece answer mode, by waiting for expiration of a predetermined time period after the call is received, but without requiring any additional keypad inputs or manipulation of the device.

As will be apparent to a person skilled in the art, the device in the form of the mobile telephone 100 advantageously comprises computer readable program code components configured to cause the device to answer the incoming call, using a first answer mode, in response to an answer call signal input from a user at a user interface of the device before expiration of a first predetermined time period. The computer readable program code components are further configured to cause the device to answer the incoming call, using a second answer mode, in response to an answer call signal input from the user at the user interface of the device after expiration of the first predetermined time period.

It will be appreciated that embodiments of the invention described herein may be comprised of one or more conventional processors and unique stored program instructions that control the one or more processors to implement, in conjunction with certain non-processor circuits, some, most, or all of the functions of answering an incoming call to an electronic communication device as described herein. The non-processor circuits may include, but are not limited to, a radio receiver, a radio transmitter, signal drivers, clock circuits, power source circuits, and user input devices. As such, these functions may be interpreted as steps of a method for answering an incoming call to an electronic communication device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

I claim:

1. A method for answering an incoming call to an electronic communication device, the method comprising:

allowing the device to answer the incoming call, using a first answer mode, in response to an answer call signal input from a user at a user interface of the device before expiration of a first predetermined time period; and allowing the device to answer the incoming call, using a second answer mode, in response to an answer call signal input from the user at the user interface of the device after expiration of the first predetermined time period.

2. The method of claim 1, wherein the first answer mode is an earpiece answer mode.

3. The method of claim 1, wherein the second answer mode is a speakerphone answer mode.

4. The method of claim 1, further comprising allowing the device to answer the incoming call, using a third answer mode, in response to an answer call signal input from the user at the user interface of the device after expiration of a second predetermined time period.

5. The method of claim 1, wherein the first answer mode and the second answer mode are each selected from a group comprising: an earpiece answer mode, a speakerphone answer mode, a low volume answer mode, a high volume answer mode, a video telephony answer mode, and a headset answer mode.

6. The method of claim 1, wherein the first predetermined time period is defined as a number of repetitions of a cycle associated with an alerting function of the device.

7. The method of claim 1, wherein the first predetermined time period is defined as a number of repetitions of a ring tone.

8. The method of claim 1, wherein an alerting function of the device changes after expiration of the first predetermined time period.

9. The method of claim 8, wherein the alerting function changes from a first ring tone to a second ring tone after expiration of the first predetermined time period.

10. The method of claim 1, further comprising indicating an impending expiration of the first predetermined time period.

11. A device for answering an incoming call, the device comprising:

computer readable program code components configured to cause the device to answer the incoming call, using a first answer mode, in response to an answer call signal input from a user at a user interface of the device before expiration of a first predetermined time period, wherein the computer readable program code components are further configured to cause the device to answer the incoming call, using a second answer mode, in response to an answer call signal input from the user at the user interface of the device after expiration of the first predetermined time period.

12. The device of claim 11, wherein the first answer mode is an earpiece answer mode.

13. The device of claim 11, wherein the second answer mode is a speakerphone answer mode.

14. The device of claim 11, further comprising computer readable program code components configured to cause the device to answer the incoming call, using a third answer mode, in response to an answer call signal input from the user at the user interface of the device after expiration of a second predetermined time period.

15. The device of claim 11, wherein the first answer mode and the second answer mode are each selected from a group comprising: an earpiece answer mode, a speakerphone answer mode, a low volume answer mode, a high volume answer mode, a video telephony answer mode, and a headset answer mode.

16. The device of claim 11, wherein the first predetermined time period is defined as a number of repetitions of a cycle associated with an alerting function of the device.

17. The device of claim 11, wherein the first predetermined time period is defined as a number of repetitions of a ring tone.

18. The device of claim 11, wherein an alerting function of the device changes after expiration of the first predetermined time period.

19. The device of claim 18, wherein the alerting function changes from a first ring tone to a second ring tone after expiration of the first predetermined time period.

20. The device of claim 11, further comprising computer readable program code components configured to cause indicating an impending expiration of the first predetermined time period.

* * * * *